(12) United States Patent
Ishizaka et al.

(10) Patent No.: US 8,555,001 B2
(45) Date of Patent: Oct. 8, 2013

(54) CACHE MEMORY, INCLUDING MISS STATUS/INFORMATION AND A METHOD USING THE SAME

(75) Inventors: Kazuhisa Ishizaka, Tokyo (JP); Takashi Miyazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 12/737,857

(22) PCT Filed: Jul. 23, 2009

(86) PCT No.: PCT/JP2009/063220
§ 371 (c)(1),
(2), (4) Date: Feb. 23, 2011

(87) PCT Pub. No.: WO2010/024071
PCT Pub. Date: Mar. 4, 2010

(65) Prior Publication Data
US 2011/0153950 A1    Jun. 23, 2011

(30) Foreign Application Priority Data
Aug. 25, 2008 (JP) ................... 2008-215392

(51) Int. Cl.
*G06F 13/00* (2006.01)
(52) U.S. Cl.
USPC .................. 711/144; 711/E12.038
(58) Field of Classification Search
None
See application file for complete search history.

(56) References Cited

U.S. PATENT DOCUMENTS

| | | | |
|---|---|---|---|
| 4,970,643 A * | 11/1990 | Cramm | 711/3 |
| 5,276,853 A | 1/1994 | Yamaguchi et al. | |
| 2005/0268037 A1* | 12/2005 | Hama et al. | 711/118 |
| 2006/0026362 A1 | 2/2006 | Yamazaki | |
| 2006/0143404 A1* | 6/2006 | Chen et al. | 711/141 |
| 2007/0192541 A1* | 8/2007 | Balasubramonian et al. | 711/118 |

FOREIGN PATENT DOCUMENTS

| | | | |
|---|---|---|---|
| JP | 63-284648 A | 11/1988 | |
| JP | 2000-311112 A | 11/2000 | |
| JP | 2000-339220 A | 12/2000 | |
| JP | 2003-15957 A | 1/2003 | |
| JP | 2003-76958 A | 3/2003 | |
| JP | 2005-196430 A | 7/2005 | |
| JP | 2006-48182 A | 2/2006 | |
| JP | 2006-285430 A | 10/2006 | |

OTHER PUBLICATIONS

Andrew S. Tanenbaum, Structed Computer Organization, 1984, Prentice Hall, Inc., 2nd edition, p. 11.*
David Kroft, "Lockup-Free Instruction Fetch/Prefetch CACHE Organization," 25 Years of the International Symposia on Computer Architecture (Selected Papers), ACM, 1998, pp. 195-201.

* cited by examiner

*Primary Examiner* — Edward Dudek, Jr.
*Assistant Examiner* — Sean D Rossiter
(74) *Attorney, Agent, or Firm* — McGinn IP Law Group, PLLC

(57) ABSTRACT

A cache memory includes: a plurality of MSHRs (Miss Status/Information Holding Registers); a memory access identification unit that identifies a memory access included in an accepted memory access request; and a memory access association unit that associates a given memory access with the MSHR that is used when the memory access turns out to be a cache miss and determines, on the basis of the association, a candidate for the MSHR that is used by the memory access identified by the access identification unit.

29 Claims, 15 Drawing Sheets

| CPU NUMBER | MSHR NUMBER |
|---|---|
| 1 | 0, 1 |
| 2 | 0, 1 |
| 3 | 0, 1 |
| 4 | 2 |

…
CACHE MEMORY, INCLUDING MISS STATUS/INFORMATION AND A METHOD USING THE SAME

TECHNICAL FIELD

The present invention relates to a cache memory that is provided in a processor and shared by a plurality of processors or threads, a system of the cache memory, a method of using the cache memory and a program using the cache memory.

BACKGROUND ART

It is known that the following is important: in a computer system that is provided with a processor, a cache memory (which may be simply referred to as "cache," hereinafter), and a main memory (which may be simply referred to as "memory," hereinafter), the cache conceals a delay time (referred to as "latency," hereinafter) caused by the slow operating speed of the memory to improve the performance of application software.

The cache is a high-speed, small-capacity memory and able to store a portion of data on the memory. If data exist (hit) on the cache when a CPU (Central Processing Unit) accesses the memory, the data is supplied to the CPU with low latency. If data do not exist (miss) on the cache, the cache acquires data from the memory and supplies the data to the CPU. As described above, the operating speed of the memory is slower than the operating speed of the CPU or cache. Therefore, the latency needed for the data to be supplied is larger. Thus, the CPU stalls for a longer period of time, resulting in a drop in the performance of applications.

Because of such nature of the cache, it is known that improving the hit rate of the cache is important. Therefore, various methods are used, including a method of altering a program to improve the hit rate and a method of using a Way lock system that does not allow data stored in the cache to be driven out of the cache.

For example, what is disclosed in PTL 1 as a related technique is a method of using page control of an OS (Operating System) to reduce the number of times the data on the cache is driven out between processes in order to improve the cache hit rate. The related technique will be described with reference to FIG. 16.

FIG. 16 shows an example of the configuration of a system including a CPU, cache and memory. In the present example, the system includes a CPU 10, a cache memory 20 and a main memory 30. The CPU 10 is connected to the cache memory 20, and the cache memory 20 to the main memory 30. The cache memory 20 includes a cache controller 21 and data memory/tag memory 22. The data memory 22 of the cache memory 20 is accessed through the cache controller 21.

When the method disclosed in the above PTL 1 is applied to the present system, it is possible to keep data in the cache from being driven out of the data memory, resulting in an increase in the cache hit rate.

As described above, the data memory 22 of the cache 20 is accessed through the cache controller 21. Therefore, it is important that the cache controller 21 should not stall in order to improve the performance of applications.

When the cache controller 21 stalls, the cache controller 21 does not accept a request for a new memory access from the CPU 10. As a result, the latency for a subsequent memory access increases until the stalling is brought to an end. In that manner, when the cache controller 21 stalls, it becomes impossible to read data therefrom even if there are data on the data memory 22. Thus, the problem is that the advantage of the method of improving the cache hit rate will be lost.

One system of cache known as blocking cache is a system in which the cache controller stalls when data is being acquired from the memory because a cache miss occurs. With the blocking cache, therefore, the problem is that when a plurality of memory accesses occurs, the latency for a subsequent memory access increases, resulting in an increase in the stalling time of the CPU.

FIG. 17 shows an example of a cache shared by two CPUs. In the present example, a first CPU 11 and a second CPU 12 are connected to a blocking cache 23, and the blocking cache 23 to a main memory 30.

In the present example, suppose that the memory access from the first CPU 11 first occurs and a cache miss then occurs. The memory access from the second CPU 12, which occurs during a process of the cache miss, needs to wait until the preceding process of the cache miss comes to an end. Due to the delay of the memory access, the second CPU 12 stalls longer in time.

What is illustrated in the above example is a cache shared by a plurality of CPUs. However, a similar problem could occur even when a cache is accessed from a single CPU. For example, a similar problem could occur in such cases as where a process of simultaneously executing a plurality of threads is supported by a CPU and a plurality of memory accesses occur from a single CPU.

To solve such a blocking cache problem, a non-blocking cache is disclosed in NPL 1. FIG. 18 shows an example of a cache shared by two CPUs. In the present example, a first CPU 11 and a second CPU 12 are connected to a main memory 30 through a non-blocking cache 24. As shown in the diagram, the non-blocking cache 24 includes a register called MSHR (Miss Status/Information Holding Register). Information required to process a cache miss is stored in the MSHR in advance, enabling a subsequent memory access to be processed during a process of the cache miss. Therefore, compared with the use of the above blocking cache, the use of the non-blocking cache makes it possible to reduce the stalling time of the CPU when a plurality of memory accesses occurs at the same time.

CITATION LIST

Patent Literature

{PTL 1} JP-A-2000-339220

Non-Patent Literature

{NPL 1} David Kroft, "LOCKUP-FREE INSTRUCTION FETCH/PREFETCH CACHE ORGANIZATION," 25 Years of the International Symposia on Computer Architecture (Selected Papers), ACM, 1998, p. 195-201

SUMMARY OF INVENTION

Technical Problem

Using the MSHR as described above, it is possible to reduce the stalling time of the CPU. However, due to the limitations of hardware resources, it is not possible to have an unlimited number of MSHRs in the non-blocking cache.

When the number of MSHRs is limited, a plurality of memory accesses occur, causing a cache miss and therefore leading to the situation where all the MSHRs are in use.

The problem is that if another memory access occurs under such circumstances, the memory access is delayed in a similar way to the case of the blocking cache, resulting in an increase in the stalling time of the CPU (see FIG. 18).

Therefore, the problem that the present invention is intended to solve is that when there is a limited number of MSHRs, there is an increase in the stalling time of the CPU.

The object of the present invention is to provide a cache memory that is able to prevent an increase in the stalling time of the CPU when a plurality of memory accesses simultaneously occurs, a system of the cache memory, a method of using the cache memory and a program using the cache memory.

Solution to Problem

A cache memory of the present invention includes: a plurality of MSHRs; a memory access identification unit that identifies a memory access included in an accepted memory access request; and a memory access association unit that associates a given memory access with the MSHR that is used when the memory access turns out to be a cache miss and determines, on the basis of the association, a candidate for the MSHR that is used by the memory access identified by the access identification unit.

A method of using a cache memory of the present invention includes: a memory access identification step of identifying a memory access included in an accepted memory access request; and a memory access association step of associating a given memory access with the MSHR that is used when the memory access turns out to be a cache miss and determining, on the basis of the association, a candidate for the MSHR that is used by the memory access identified at the access identification step, wherein the steps are each performed by a cache memory including a plurality of MSHRs.

A program of the present invention causes a computer to function as: a plurality of MSHRs; a memory access identification unit that identifies a memory access included in an accepted memory access request; and a memory access association unit that associates a given memory access with the MSHR that is used when the memory access turns out to be a cache miss and determines, on the basis of the association, a candidate for the MSHR that is used by the memory access identified by the access identification unit.

Advantageous Effects of Invention

According to the present invention, it is possible to prevent an increase in the stalling time of the CPU when a plurality of memory accesses simultaneously occurs.

DESCRIPTION OF EMBODIMENTS

The following describes in detail exemplary embodiments of the present invention with reference to the accompanying drawings.

First Exemplary Embodiment

Figure 1:
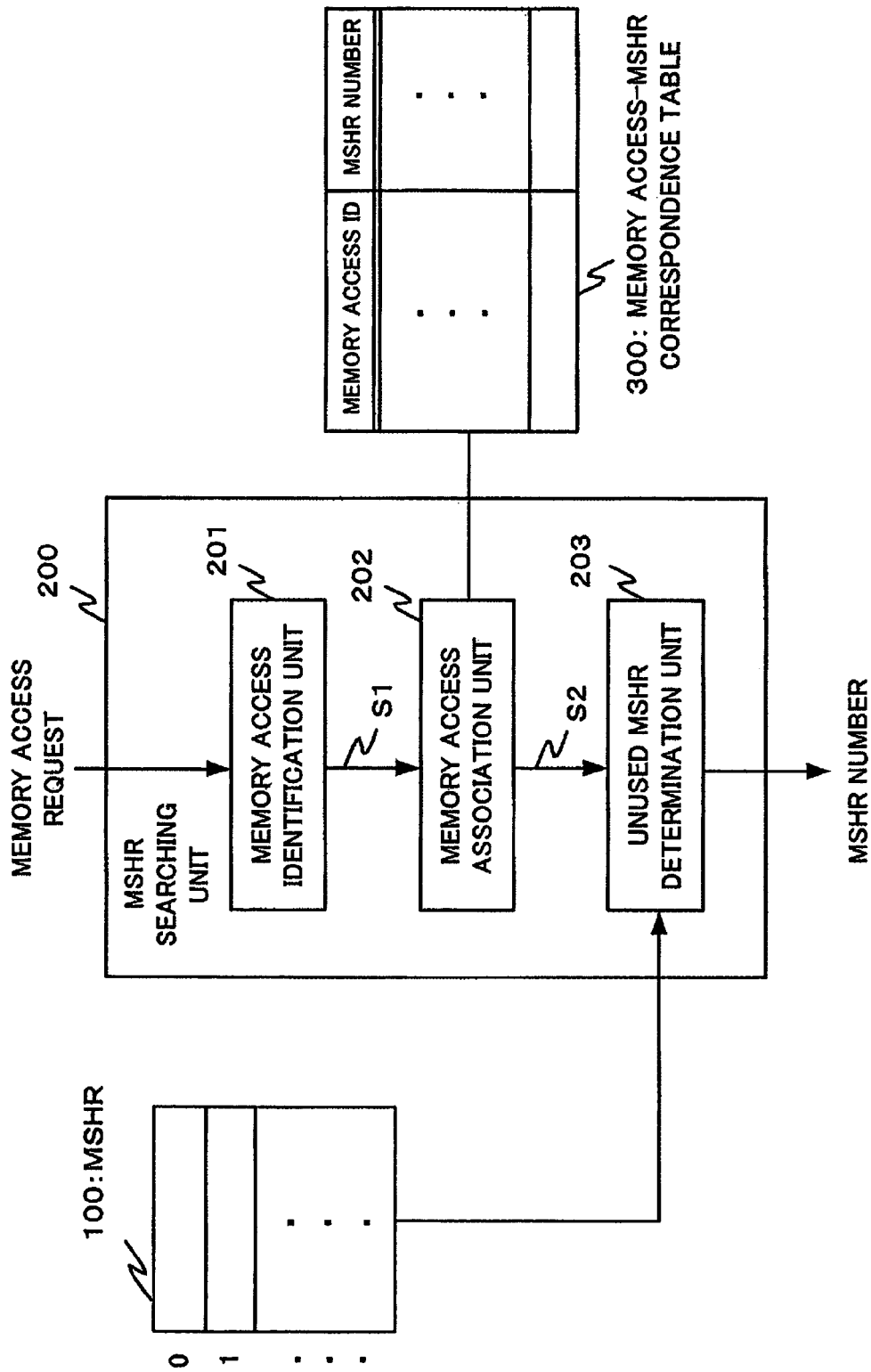
FIG. 1 A diagram illustrating the configuration according to a first exemplary embodiment of the present invention.

A first exemplary embodiment of the present invention is shown in FIG. 1. A cache controller in a cache memory (cache) of the present exemplary embodiment includes a MSHR 100, a MSHR searching unit 200 and a memory access-MSHR correspondence table 300. In the example shown in FIG. 1, other elements such as data memory/tag memory that the cache memory has, as well as a processor (CPU), main memory and other elements connected to the cache memory, are not shown.

The MSHR 100 is a plurality of MSHRs. A number is allocated to each of the MSHRs.

The MSHR searching unit 200 includes a memory access identification unit 201, a memory access association unit 202 and an unused MSHR determination unit 203.

The memory access identification unit 201 includes a function of determining a memory access ID (represented by S1 in the diagram). The memory access ID is an identifier for associating a memory access with a MSHR from a memory access request to the cache.

The memory access association unit 202 includes a function of searching the memory access-MSHR correspondence table 300 to determine a candidate MSHR number corresponding to a memory access ID.

The unused MSHR determination unit 203 includes a function of determining a MSHR number used for a memory access from a candidate MSHR number (represented by S2 in the diagram) and unused MSHR information.

The memory access-MSHR correspondence table 300 is a table on which the MSHR numbers that are available for a memory access are recorded. On the memory access-MSHR correspondence table 300, memory access IDs and MSHR numbers are recorded. The memory access-MSHR correspondence table 300 is stored in the cache. It is possible to alter the contents of the memory access-MSHR correspondence table 300 from outside the cache.

The following describes in detail an operation of the present exemplary embodiment using the drawings.

First, an expected memory access operation of the present exemplary embodiment will be described with reference to FIG. 2.

A processor makes a memory access request (Step S101). In general, the memory access request includes an address, data (for writing), a page attribute and other kinds of information.

The cache controller calls the MSHR searching unit 200 and makes an attempt to acquire an unused MSHR (Step S102).

When an unused MSHR is not acquired as a result, the cache controller suspends a process of the memory access until an unused MSHR is acquired (No at step S103).

When an unused MSHR is acquired (Yes at step S103), the cache controller makes a cache hit/miss determination (Step S104).

When the result represents a cache hit (Yes at step S105), data is read from the data memory and transferred to the CPU (Step S106).

When the result represents a cache miss (No at step S105), information required for a MSHR is stored, data is read from the main memory, and the data is transferred to the CPU after the data is acquired (Step S107). At this time, the MSHR shifts from being in use back to an unused state.

Figure 18:
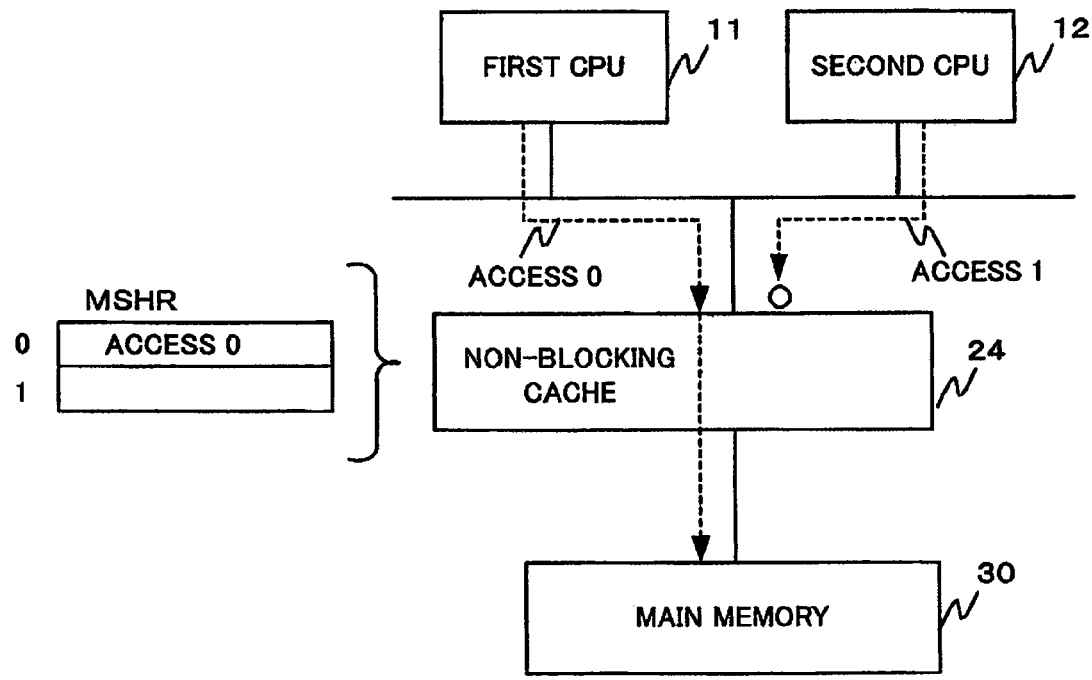
FIG. 18 A diagram showing an operation of a non-blocking cache according to a related technique of the present invention.

The following describes in detail an operation of searching for an unused MSHR (which is equivalent to the above step S102) according to the present exemplary embodiment, with reference to FIG. 18.

The MSHR searching unit 200 is called (Step S201).

The memory access identification unit 201 of the MSHR searching unit 200 determines a memory access ID from information included in a memory access request (Step S202).

The memory access association unit 202 of the MSHR searching unit 200 is called as the memory access ID is input; using the memory access-MSHR correspondence table 300, the memory access association unit 202 searches for a MSHR number corresponding to the input memory access ID (Step S203).

When the search result shows that the memory access ID and the corresponding MSHR number exist (Yes at step S203), the MSHR number corresponding to the memory access ID is determined as a candidate MSHR number (Step S204). Incidentally, if a plurality of MSHR numbers corresponding to the memory access ID is recorded on the table, a plurality of the MSHR numbers may be regarded as candidate MSHR numbers. When there is no MSHR number corresponding to the memory access ID on the memory access-MSHR correspondence table 300 (No at step S203), what is performed is an operation of returning a predetermined default MSHR number as a candidate MSHR number (Step S205).

The unused MSHR determination unit 203 of the MSHR searching unit 200 is called as the candidate MSHR number is input; for the candidate MSHR, the unused MSHR determination unit 203 examines a bit that is recorded in the MSHR and indicates whether the MSHR is being used (Step S206).

When the candidate MSHR is not being used as a result (No at step S206), the MSHR is regarded as a search result of the MSHR searching unit 200 (step S207). At this time, if there is a plurality of unused MSHRs, one of the unused MSHRs is regarded as the search result. When the candidate MSHR is being used (Yes at step S206), a result indicating that there is no unused MSHR is returned as a search result (Step S208).

The following explains an example of the case where three memory accesses occur in order to describe the advantages of the present exemplary embodiment. Suppose that the memory access IDs are 1, 1 and 2, respectively, in that order. According to the present description, suppose that there are two MSHRs, both of which are not in use. What is recorded on the memory access-MSHR correspondence table 300 is 1 for the MSHR number corresponding to the memory access ID1, as well as 1 and 2 for the MSHR numbers corresponding to the memory access ID2.

(1) The CPU issues a first memory access request.

(2) The cache controller calls the MSHR searching unit 200 to obtain a MSHR 1.

(3) When the first memory access turns out to be a cache miss, then information is recorded in the MSHR 1 and data is read from the memory.

(4) During a process of reading data from the memory, the CPU issues a second memory access request. Incidentally, the first and second memory access requests may be issued by the same CPU or by different CPUs. If the same CPU is used, it is evident that the CPU needs to have a function able to issue a plurality of memory accesses at the same time.

(5) The cache controller calls the MSHR searching unit 200. However, since the MSHR 1, which is the corresponding MSHR when the memory access ID is 1, is being used, it is not possible to obtain an available MSHR.

(6) The cache controller puts a process of the second memory access on hold.

(7) The CPU issues a third memory access request.

(8) The cache controller calls the MSHR searching unit 200 to obtain a MSHR 2.

(9) The cache controller uses the MSHR 2 to process the third memory access.

With the use of the present exemplary embodiment, as described above, it is possible for the cache controller to process the third access despite the fact that there are only two MSHRs.

For example, when a memory access ID issued by a high-priority application is recognized as 2 and when a memory access ID issued by another application is recognized as 1, the use of one MSHR by the high-priority application is guaranteed anytime even if the another application has issued a plurality of memory accesses.

With a cache controller that does not use the present exemplary embodiment, it turns out that the MSHR 2 is used by the second memory access and, when a memory access of the high-priority application (which corresponds to the third memory access in the above-described case) occurs, there is no unused MSHR. As a result, the high-priority application is delayed.

With the use of the present exemplary embodiment, even if a plurality of memory accesses occur from another application, it is possible to curb a drop in the performance of the high-priority application.

As described above, in the case where two MSHRs are available, the use of the present exemplary embodiment makes it possible for the high-priority application to use at least one MSHR even when the high-priority application and another application run at the same time. Therefore, it is possible to curb a drop in the performance of the high-priority application. Thus, it is possible to curb a difference in performance between the case where a single high-priority application runs and the case where the high-priority application and another application run simultaneously. Therefore, it is possible to improve the predictability of the performance of the high-priority application.

According to another configuration of the present exemplary embodiment, the memory access-MSHR correspondence table 300 may be recorded in a memory outside the cache, such as a main memory. In this case, it is desirable that a portion of the contents of the memory access-MSHR correspondence table 300 be recorded by a high-speed memory in the cache so that high-speed search is possible.

Second Exemplary Embodiment

The following describes a second exemplary embodiment of the present invention.

Figure 4:
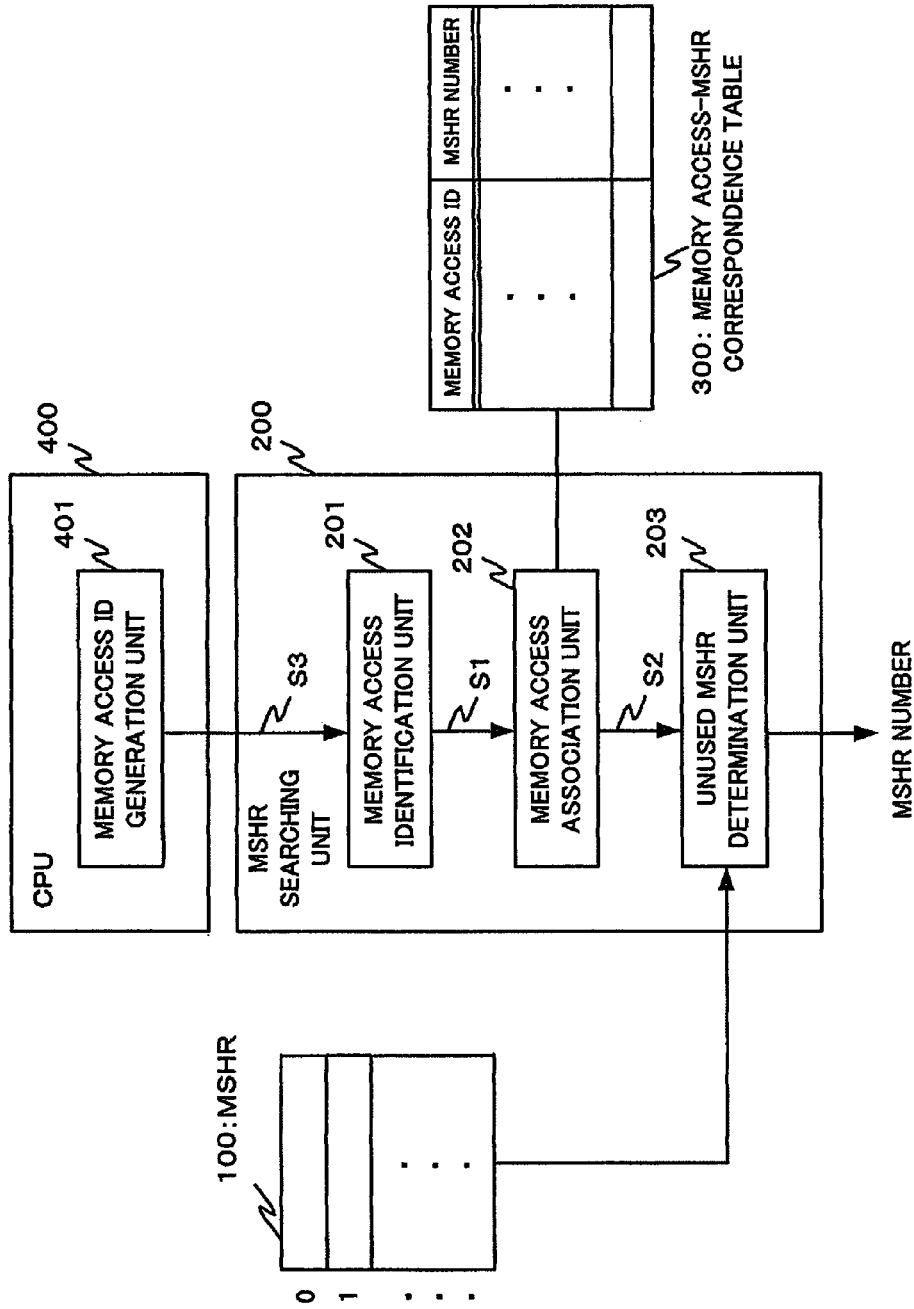
FIG. 4 A diagram illustrating a configuration according to a second exemplary embodiment of the present invention.

FIG. 4 shows the configuration of the present exemplary embodiment. A cache controller in a cache memory of the present exemplary embodiment includes a plurality of MSHRs 100, a MSHR searching unit 200 and a memory access-MSHR correspondence table 300. The MSHR searching unit 200 includes a memory access identification unit 201, a memory access association unit 202 and an unused MSHR determination unit 203. The above point is the same as that of the first exemplary embodiment. Moreover, the present exemplary embodiment is characterized in that a CPU 400 connected to the cache memory includes a memory access ID generation unit 401.

The memory access ID generation unit 401 of the CPU 100 includes a function of adding a memory access ID to a memory access request when the memory access request is issued. The memory access request to which the memory access ID is added is represented by S3 in the diagram.

The memory access identification unit 201 of the present exemplary embodiment determines the memory access ID, which is added to the memory access, as a memory access ID without changing the memory access ID.

The memory access association unit 202, unused MSHR determination unit 203 and memory access-MSHR correspondence table 300 of the present exemplary embodiment are the same as those of the first exemplary embodiment.

Figure 2:
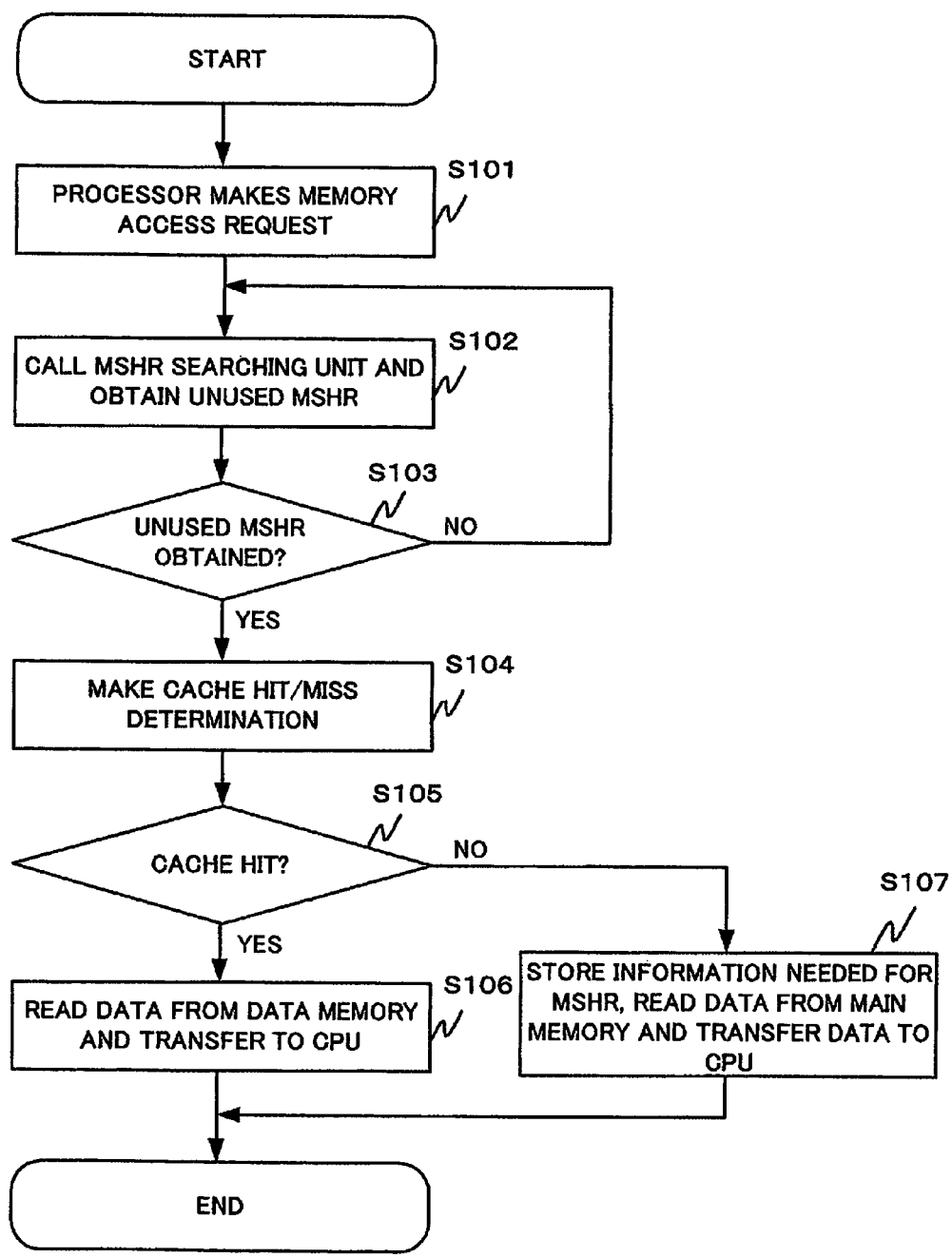
FIG. 2 A flowchart (1/2) illustrating a basic operation according to the first exemplary embodiment of the present invention.
Figure 3:
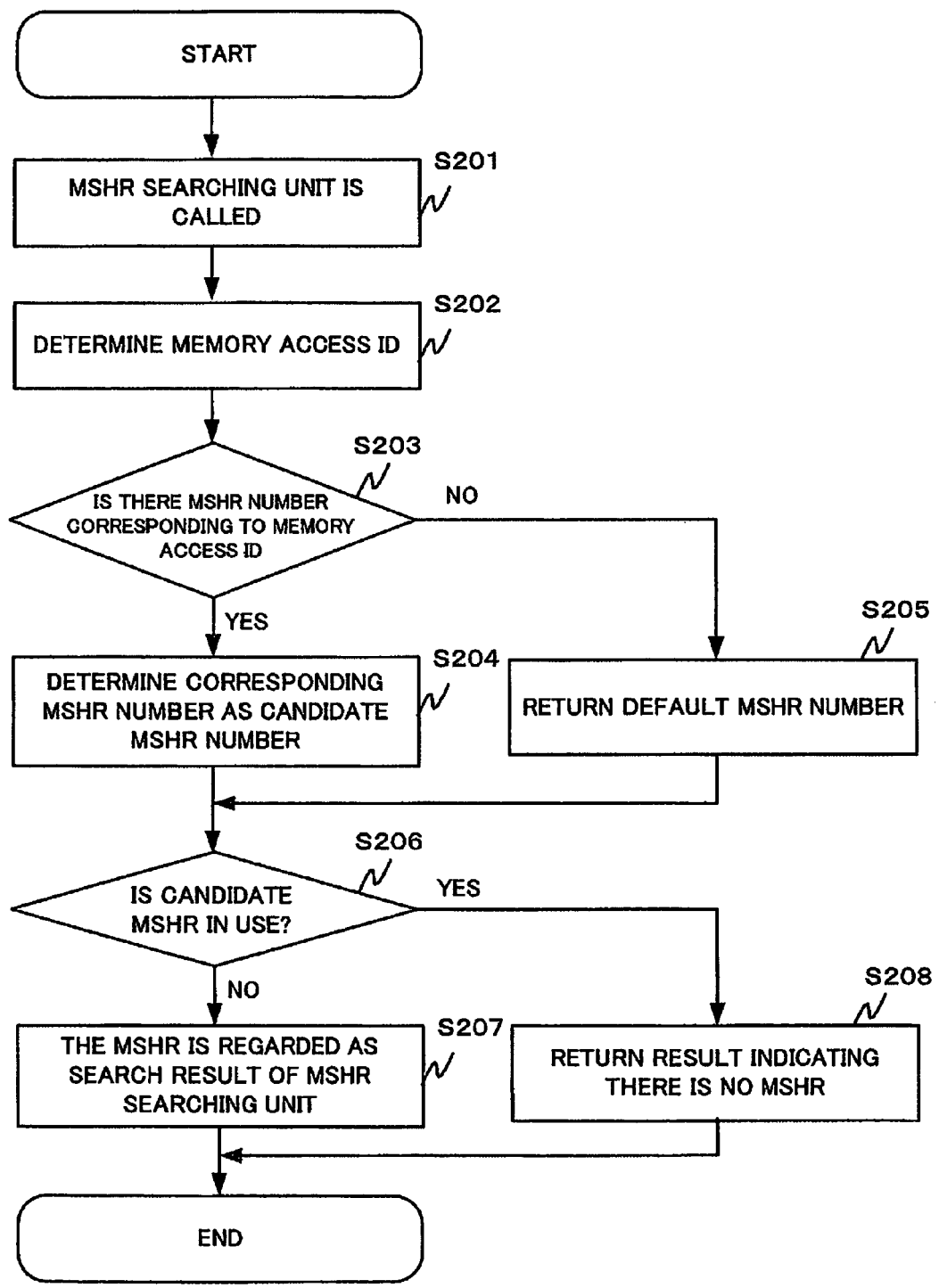
FIG. 3 A flowchart (2/2) illustrating a basic operation according to the first exemplary embodiment of the present invention.
Figure 6:
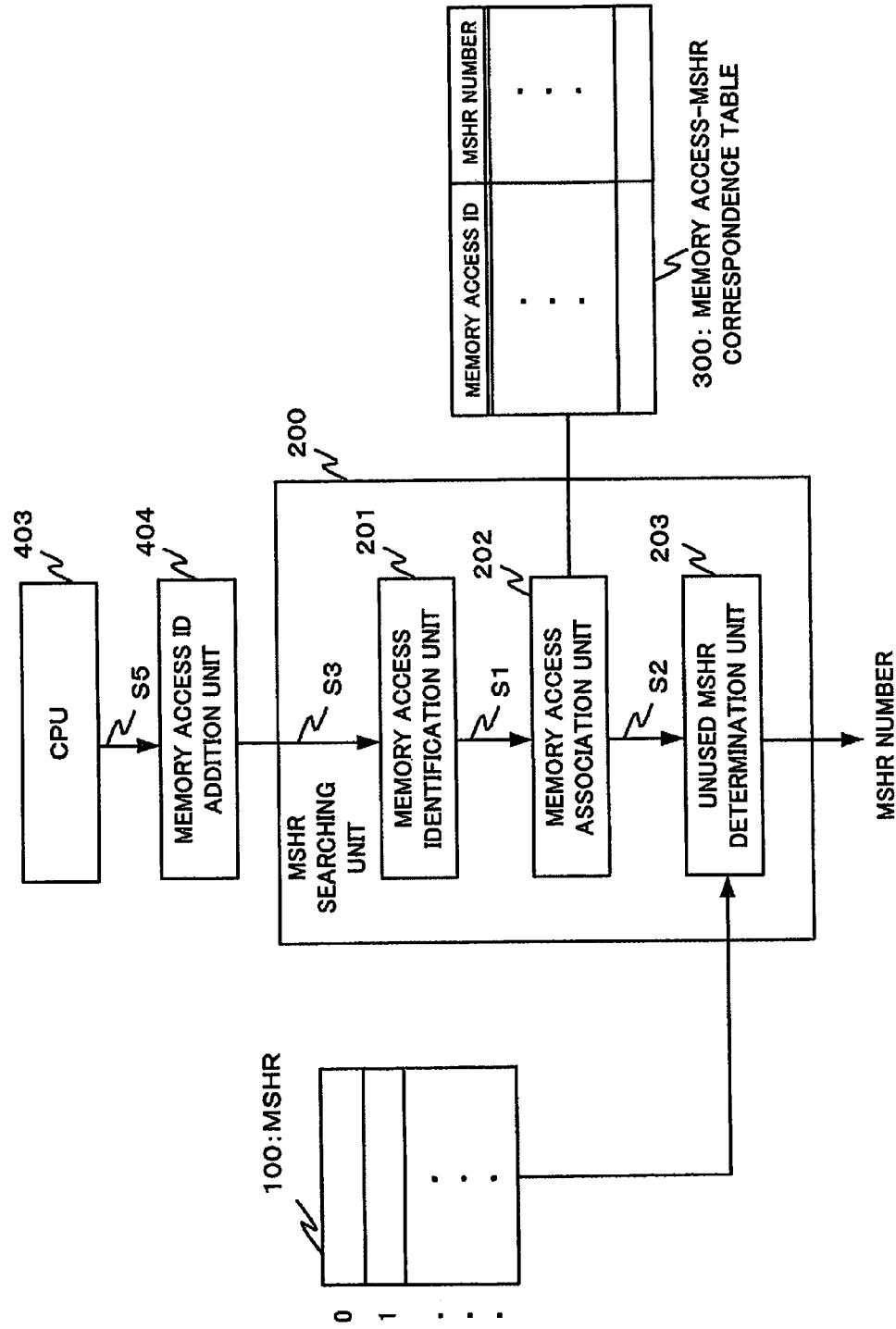
FIG. 6 A diagram illustrating the configuration according to a third exemplary embodiment of the present invention.

An operation of the present exemplary embodiment is evident from the operation of the first exemplary embodiment of the present invention (see FIGS. 2 and 6).

It is also evident from the above description of the first exemplary embodiment that the present exemplary embodiment has the advantage that it is possible to prevent an increase in the latency of the memory access.

According to the present exemplary embodiment, the CPU 400 can add a given memory access ID. Therefore, compared with the case where the cache controller determines a memory access ID only from the information included in the memory access request, the present exemplary embodiment has the advantage that if is possible to increase flexibility in associating a memory access with a MSHR.

Figure 5:
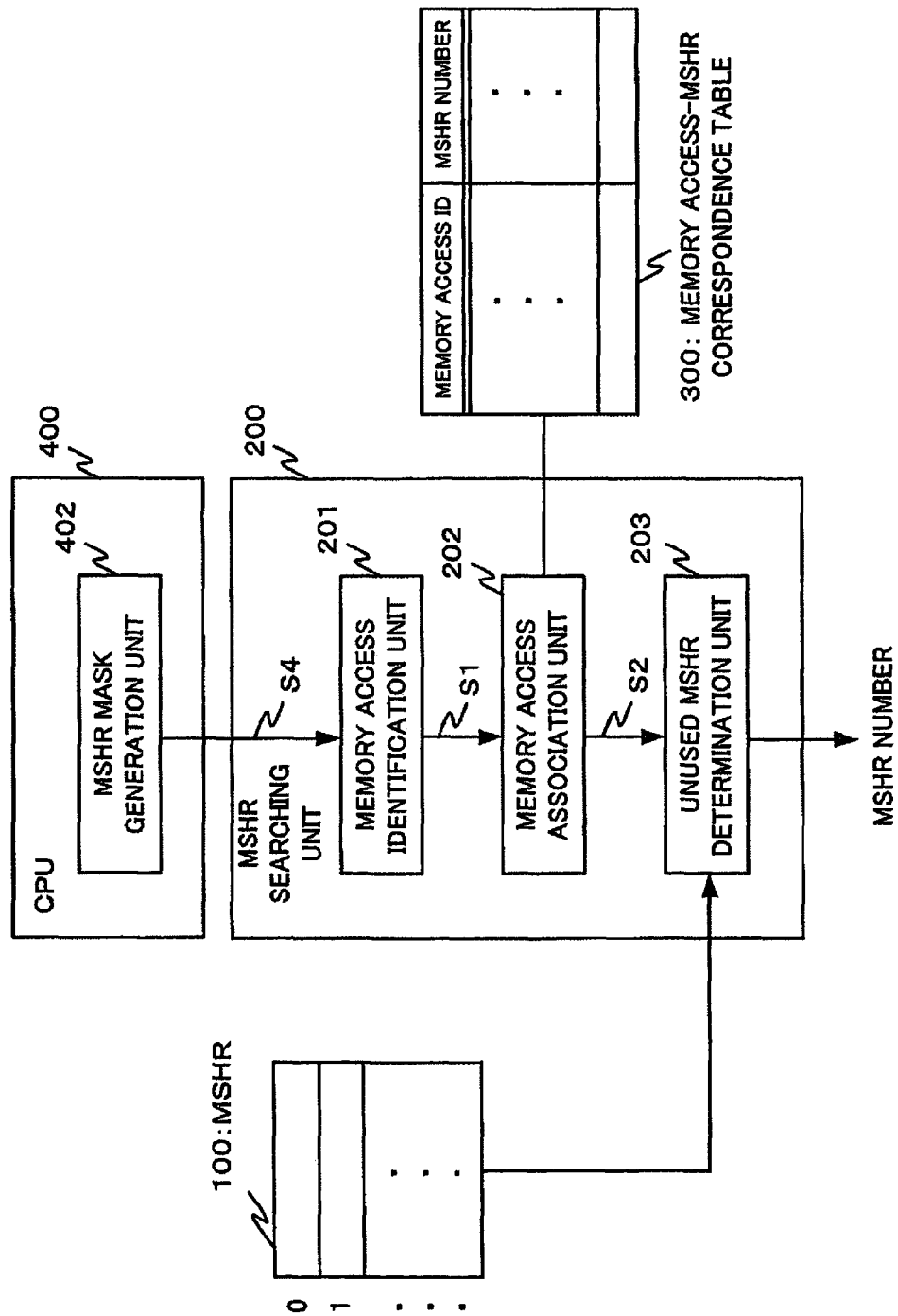
FIG. 5 A diagram illustrating another configuration according to the second exemplary embodiment of the present invention.

According to another configuration of the present exemplary embodiment, as shown in FIG. 5, the CPU may include a MSHR mask generation unit 402 as a memory access ID generation unit.

The MSHR mask generation unit 402 includes a function of adding a group of MSHRs as a memory access ID to a memory access request: the group of MSHRs are available for a memory access. In this case, the group is referred to as "MSHR mask". The memory access request to which the memory access ID (MSHR mask) is added is represented by S4 in the diagram.

According to the above-described exemplary embodiments, the candidate MSHR number is determined from the memory access ID with the use of the memory access-MSHR correspondence table 300. Meanwhile, according to the present exemplary embodiment, since the memory access request includes a MSHR mask, all that is required is for the memory access association unit 202 of the cache controller to set the MSHR included in the MSHR mask just as the candidate MSHR number. Therefore, the present exemplary embodiment has the advantage that it is possible to make the MSHR searching unit 200 simple.

Third Exemplary Embodiment

The following describes a third exemplary embodiment of the present invention using the drawings.

FIG. 6 shows the configuration of the present exemplary embodiment. A cache controller in a cache memory of the present exemplary embodiment includes a plurality of MSHRs 100, a MSHR searching unit 200 and a memory access-MSHR correspondence table 300. The MSHR searching unit 200 includes a memory access identification unit 201, a memory access association unit 202 and an unused MSHR determination unit 203. The above point is the same as that of the first exemplary embodiment. Moreover, the present exemplary embodiment is characterized in that a memory access ID addition unit 404 is provided between a CPU 403 connected to the cache memory and the cache controller.

As a memory access request (represented by S5 in the diagram) is input from the CPU 403, the memory access ID addition unit 404 adds a memory access ID to the memory access request. The memory access ID addition unit 404 includes a function of issuing the memory access request (represented by S3 in the diagram as in the case of the second exemplary embodiment) to which the memory access ID is added to the cache.

Since the memory access ID is added between the CPU and the cache controller, the present exemplary embodiment has the advantage that unlike the second exemplary embodiment, it is not necessary to add the memory access ID generation unit 401 to the CPU.

Because of rights-related issues, it is not possible to add the memory access ID generation unit 401 to the CPU, i.e. it is not possible to modify the inside of the CPU. It also takes enormous man-hours to modify the inside of the CPU, and there are other problems. Therefore, it is evident to those skilled in the art that the present exemplary embodiment is beneficial.

An operation of the present exemplary embodiment is evident from the operations of the first and second exemplary embodiments (see FIGS. 2 and 6). It is also evident from the above description of the advantages of the first and second exemplary embodiments that the present exemplary embodiment has the advantage that it is possible to curb an increase in the latency of the memory access.

According to another configuration of the present exemplary embodiment; a MSHR mask addition unit 405 may be used in the memory access ID addition unit 404 to add a MSHR mask as a memory access ID. In this case, as in the case of the another configuration of the second exemplary embodiment, the advantage is that the memory access-MSHR correspondence table 300 is not required.

Fourth Exemplary Embodiment

Figure 7:
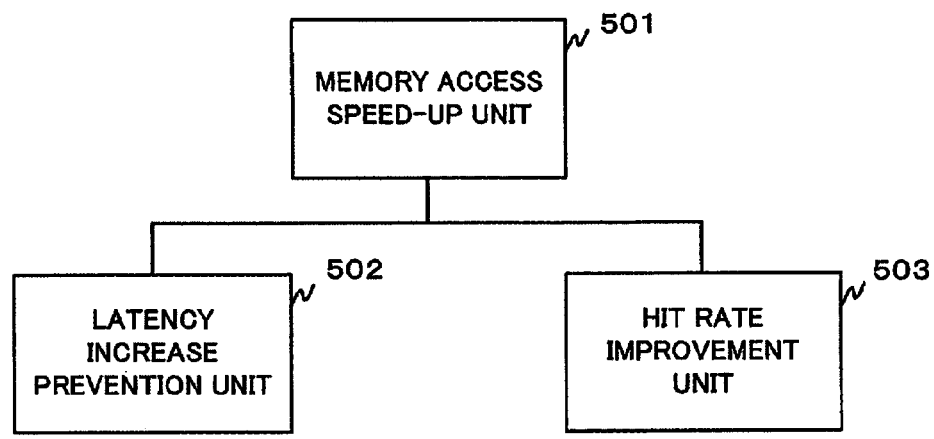
FIG. 7 A diagram illustrating the configuration according to a fourth exemplary embodiment of the present invention.

The following describes a fourth exemplary embodiment of the present invention using the drawings. FIG. 7 shows the configuration of the present exemplary embodiment.

A cache memory system of the present exemplary embodiment includes a memory access speed-up unit 501, a latency increase prevention unit 502 and a hit rate improvement unit 503.

The latency increase prevention unit 502 is a portion designed to prevent an increase of the latency during a cache access. The latency increase prevention unit 502 has the same structure as any one of the cache controllers of the cache memories of the above-described first to third exemplary embodiments.

The hit rate improvement unit 503 is a portion that is so set as to prevent data used by a high-priority application from being driven out of a cache by another application. Thus, the hit rate improvement unit 503 improves the hit rate when the high-priority application is accessing.

The memory access speed-up unit 501 is a portion that uses the memory access speed-up unit 501 in combination with the latency increase prevention unit 502.

An operation of the present exemplary embodiment will be described with the use of an example in which the speed of a memory access of the high-priority application is raised.

(1) The memory access speed-up unit 501 calls the hit rate improvement unit 502 and sets up so that the data used by the high-priority application is not driven out of the cache by another application.

(2) The memory access speed-up unit 501 calls the latency increase prevention unit 502 and sets up in a way that prevents an increase of the latency, which could occur when applications other than the high-priority application access the memory and all the MSHRs are used, at a time when the high-priority application accesses the memory.

With the use of only the cache hit rate improvement unit 503, there is the problem that as the latency increases due to other applications accessing the memory, the latency increases even when the memory access comes with a cache hit.

If there is no change to the hit when only the latency increase prevention unit 502 is used, it is possible to prevent an increase of the latency. However, in addition to the case where other applications do not run, it is not possible to reduce the latency.

According to the present exemplary embodiment, the latency increase prevention unit 502 is used to prevent an increase of the latency by other applications. Therefore, the present exemplary embodiment has the advantage that it is possible to maximize the advantage of the increased hit rate that is attributable to the use of the cache hit rate improvement unit 503. That is, with the use of both, it is possible to efficiently prevent an increase in the stalling time of the CPU.

EXAMPLE 1

The following describes an exemplary embodiment of the present invention using a concrete example. A first example is an example corresponding to the first exemplary embodiment of the present invention.

Figure 8:
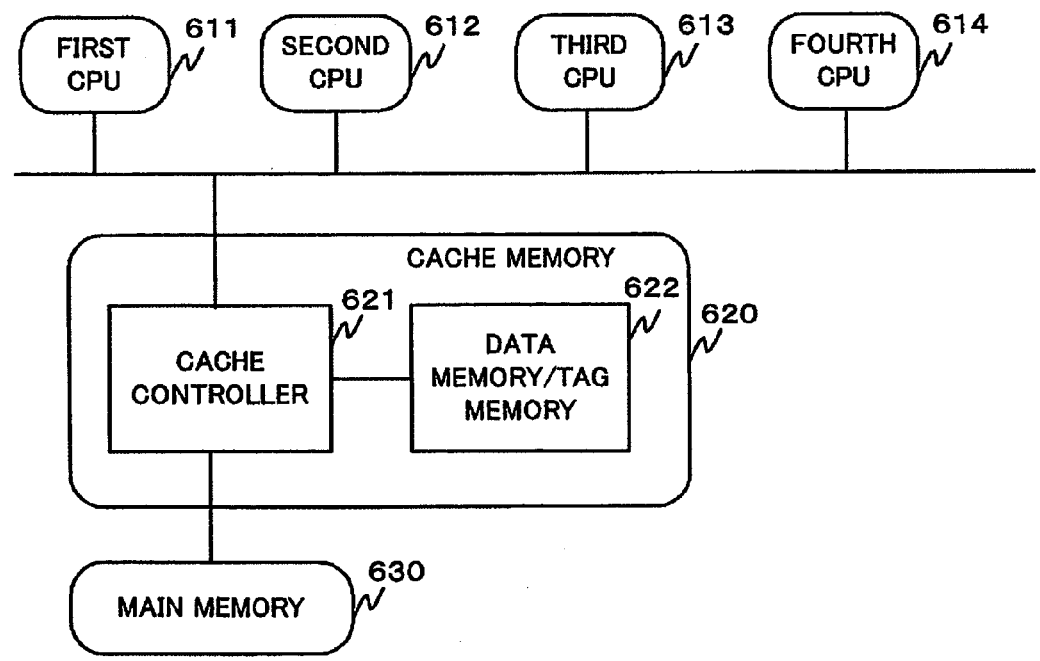
FIG. 8 A diagram illustrating the configuration according to a first example of the present invention.

As shown in FIG. 8, in a cache memory system of the present example, a cache memory 620 including a cache controller 621 and data memory/tag memory 622 is shared by a plurality of CPUs. In the present example, the cache memory 620 is shared by four CPUs, i.e. a first CPU 611 to fourth CPU 614. A memory access request issued by each of the CPUs 611 to 614 contains a CPU number.

Figure 9:
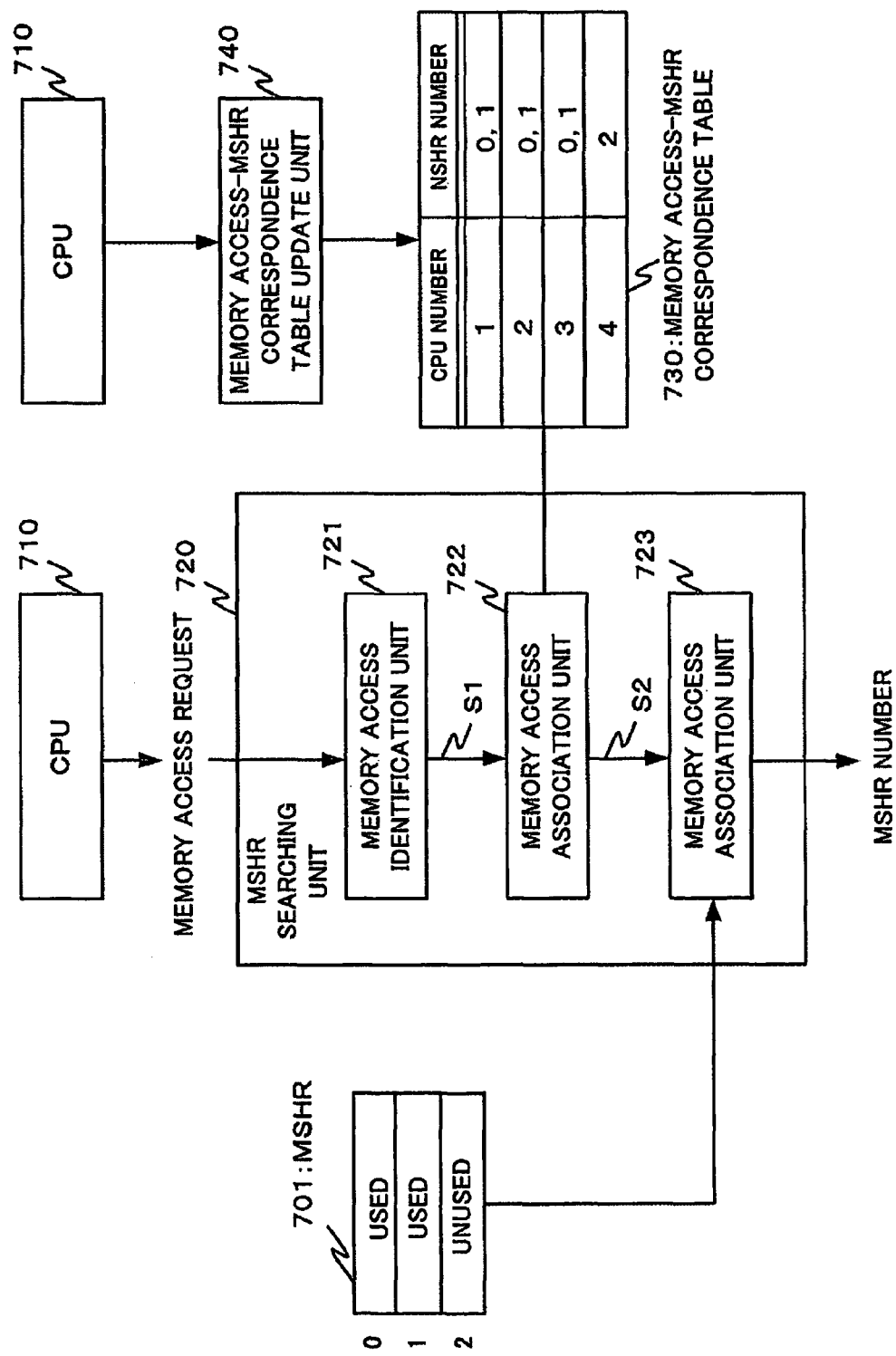
FIG. 9 A diagram illustrating the configuration of a cache controller according to the first example of the present invention.

FIG. 9 shows the configuration of the cache controller 621. The cache controller shown in the diagram is characterized by including three MSHRs 701, a MSHR searching unit 720, a memory access-MSHR correspondence table 730, and a memory access-MSHR correspondence table update unit 740. The MSHR searching unit 720 includes a memory access identification unit 721, a memory access association unit 722 and an unused MSHR determination unit 723. The CPU 710 shown in FIG. 9 corresponds to any one of the first to fourth CPUs 611 to 614 shown in FIG. 8. Incidentally, it is evident to those skilled in the art that FIG. 9 shows only a portion of the present invention in the cache controller 621.

The memory access identification unit 721 includes a function of determining a CPU number included in a memory access request as a memory access ID. That is, the present example is characterized in that the CPU number is associated with a MSHR.

The memory access-MSHR correspondence table update unit 740 has a function of updating the memory access-MSHR correspondence table 730 in response to a request from the CPU 710.

In the present example, suppose that as shown in FIG. 9, the memory access-MSHR correspondence table 730 is created with the use of the memory access-MSHR correspondence table update unit 740. The contents thereof show that a MSHR 0 and a MSHR 1 are available to the first CPU 611, the second CPU 622 and the third CPU 633 and that a MSHR 2 is available to the fourth CPU 624. That is, the processes of accessing memories from the first CPU 611, the second CPU 622 and the third CPU 633 do not lead to a depletion of MSHRs that are available to the fourth CPU 624.

The following describes an operation of the case where memory accesses for the first CPU 611 and the fourth CPU 624 occur in that order in order to explain an operation of the present example in a concrete way. In terms of how the MSHRs are used before the above memory accesses occur, as shown in FIG. 9, the MSHRs 0 and 1 are being used while the MSHR 2 is not being used.

First, the following describes an operation of the MSHR searching unit 720 when a memory access is issued by the first CPU 611.

(1) The memory access identification unit 721 determines 1 as a memory access ID.

(2) Then, the memory access association unit 722 determines 0 and 1 as candidate MSHR numbers on the basis of the memory access-MSHR correspondence table 730.

(3) Finally, the unused MSHR determination unit 723 determines that there is no unused MSHR since the MSHRs 0 and 1 are in use.

Accordingly, the memory access is forced to wait until the MSHR 0 or 1 becomes available.

The following describes an operation of the MSHR searching unit 720 when a memory access is issued by the fourth CPU 624.

(1) The memory access identification unit 721 determines 4 as a memory access ID.

(2) Then, the memory access association unit 722 determines 2 as a candidate MSHR number on the basis of the memory access-MSHR correspondence table.

(3) The unused MSHR determination unit 723 determines that an unused MSHR is 2 since the MSHR 2 is unused.

Accordingly, the memory access issued by the fourth CPU 624 is processed with the use of the MSHR 2.

Thanks to the above operation, it is possible for the fourth CPU 624 to use one MSHR anytime regardless of whether there is a memory access from other CPUs. Therefore, it is possible to curb an increase of the latency.

That is, the present example has the advantage that it is possible to curb an increase in the stalling time of the fourth CPU 624 that is attributable to the memory access competition between the CPUs.

As for an operation of a cache that does not use the exemplary embodiments of the present invention or the present example, when the memory access from the preceding first CPU 611 turns out to be a cache miss, then the MSHR 2 is used. Therefore, because of the depletion of MSHRs, the memory access from the fourth CPU 624 is forced to wait until a MSHR becomes available, resulting in an increase in the memory access latency as well as an increase in the stalling time of the fourth CPU 624.

EXAMPLE 2

The following describes a second example of the present invention. The present example corresponds to the fourth exemplary embodiment of the present invention; a latency increase prevention unit is used in combination with a hit rate improvement unit.

Figure 10:
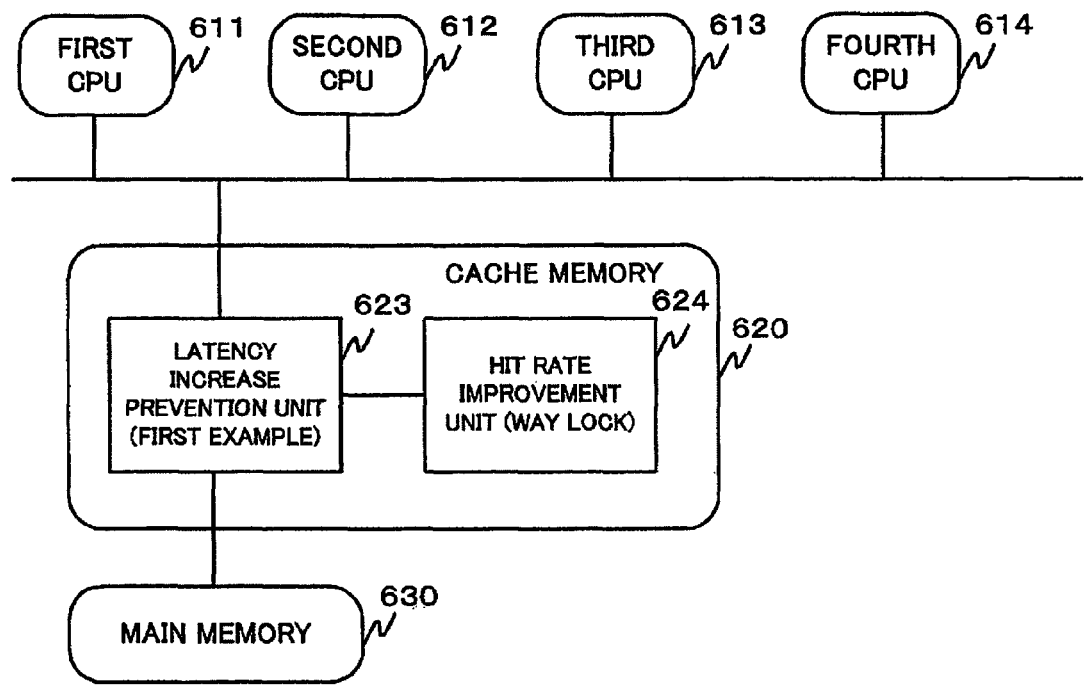
FIG. 10 A diagram illustrating the configuration according to a second example of the present invention.

FIG. 10 shows the configuration of the present example. In a cache memory system of the present example, a cache memory 620 is shared by four CPUs 611 to 614. The cache memory 620 includes a latency increase prevention unit 623 and a hit rate improvement unit 624. Incidentally, the latency increase prevention unit 623 corresponds to the configuration of any one of the cache controllers of the cache memories of the above-described exemplary embodiments. However, the present example will be described on the assumption that the configuration is the same as that of the above-described first example.

Figures 11, 12:
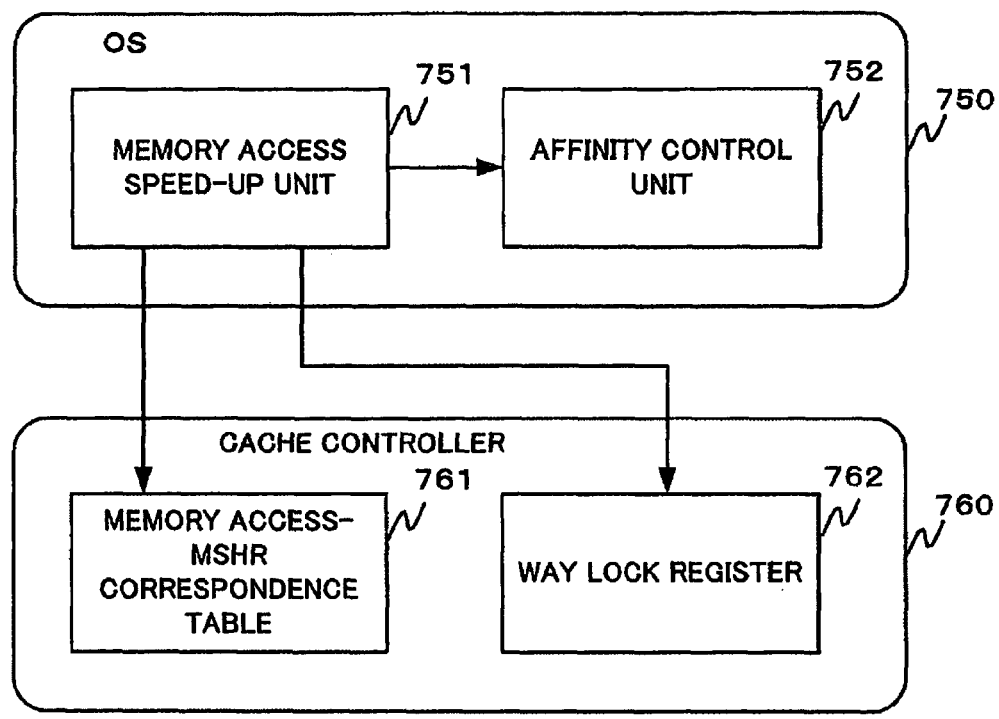
FIG. 11 A diagram illustrating the configuration of an OS and cache controller according to the second example of the present invention.
FIG. 12 A diagram illustrating an operation according to the second example of the present invention.

FIG. 11 shows the configuration of an OS and cache controller in the present example.

In the present example, a memory access speed-up unit 751, which is added to the inside of an OS 750, uses a memory access-MSHR correspondence table 761 of a cache controller 760 and a Way lock register 762 to connect the latency increase prevention unit 623 to the hit rate improvement unit 624.

For the latency increase prevention unit 623, the cache controller includes a plurality of MSHRs, a MSHR searching unit, a memory access-MSHR correspondence table, and a memory access-MSHR correspondence table update unit; the configuration of the cache controller is the same as that of the cache controller of the first example. The MSHR searching unit includes a memory access identification unit, a memory access association unit and an unused MSHR determination unit; the configuration of the MSHR searching unit is the same as that in the first example. It is clear from the first example that the present cache controller works to reduce the latency. Therefore, the operation will not be described here.

In the present example, a Way lock is used for the cache hit rate improvement unit 624. The Way lock means that several of a plurality of Ways that a data memory of the cache includes are locked to prohibit data from being driven out of the locked Ways.

In the present example, a value is set in the Way lock register 762 in order to specify which Way is to be locked. When the Way lock is used, data stored in the locked Way inevitably turns out to be a cache hit, resulting in an increase in the cache hit rate.

As for an operation of the present example, the following describes the case in which the speed of a memory access of a high-priority application is raised. In the present example, data that the high-priority application frequently uses is first Way-locked.

A procedure at the time is as follows:

(1) The memory access speed-up unit 751 of the OS 750 updates the Way lock register 762 and locks Ways other than those in which data that the high-priority application frequently uses are stored.

(2) The memory access speed-up unit 751 of the OS reads out the data that the high-priority application frequently uses, thereby loading the data into the unlocked Ways.

(3) The Ways that are not locked at (1) are locked, while the Ways that are locked at (1) are unlocked.

According to the above procedure, the data that the high-priority application frequently uses are stored in the cache; the Way in which the data that the high-priority application frequently uses are stored is locked. Since the Way in which the data that the high-priority application frequently uses are stored is locked, the data that high-priority application frequently uses always turns out to be a cache hit.

Then, the memory access speed-up unit 751 assigns a process of the high-priority application to the fourth CPU 614, and a process of another application to any of the first to third CPUs 611 to 613. It is evident to those skilled in the art that the assignment can be realized with the use of an affinity function of the OS. FIG. 11 shows an affinity control unit 752 as a portion to control the affinity function.

Finally, the memory access speed-up unit 751 sets the memory access-MSHR correspondence table 761 as shown in FIG. 12. Since the memory access-MSHR correspondence table 761 is set as shown in FIG. 12, it is possible to curb an increase of the latency, which could occur due to a depletion of MSHRs for the high-priority application.

Thanks to the above operation, the cache hit rate of the high-priority application rises; it is possible to prevent an increase of the latency that is attributable to the memory access competition with other applications. Therefore, the speed of the memory access of the high-priority application increases.

EXAMPLE 3

Figure 13:
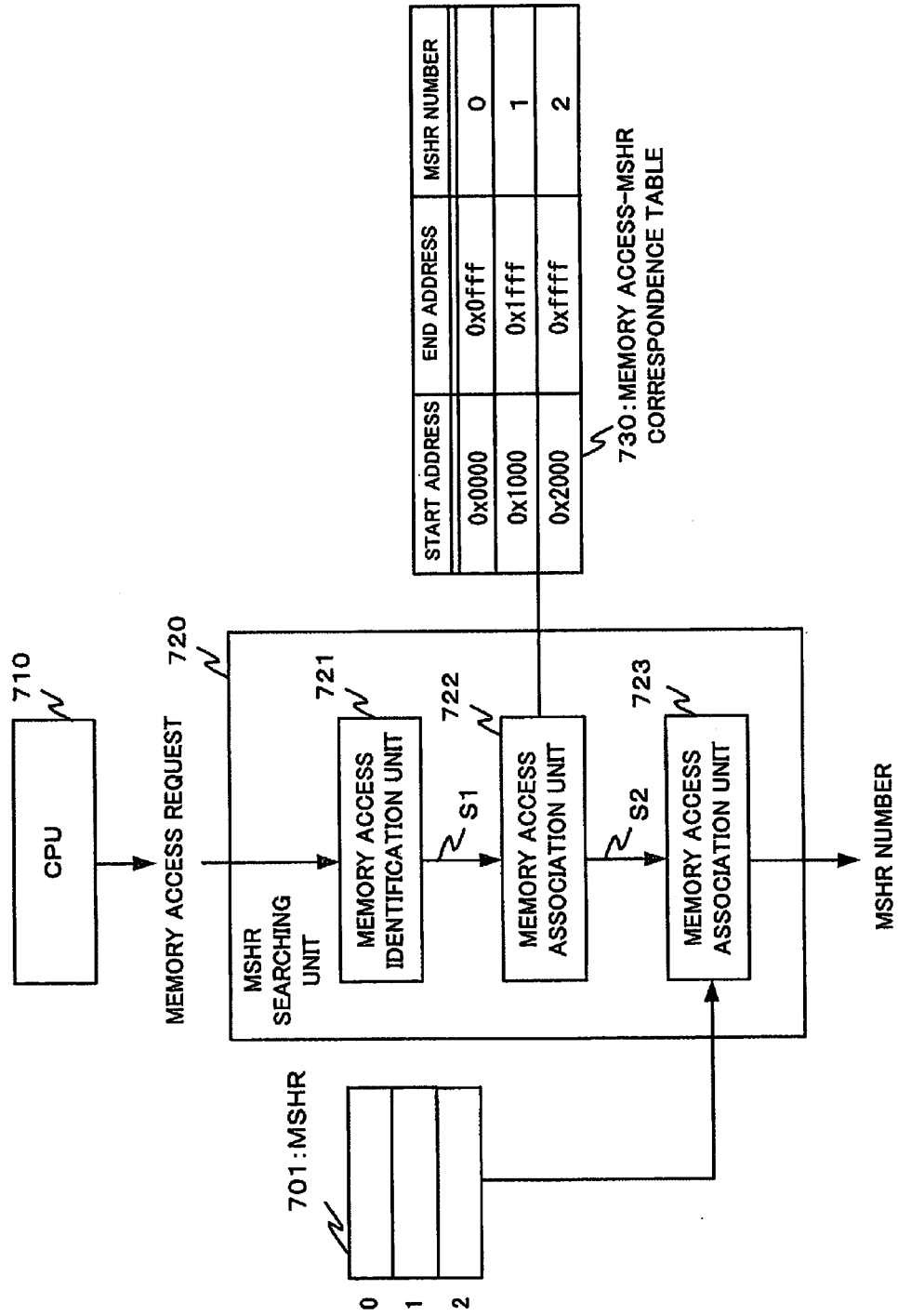
FIG. 13 A diagram illustrating the configuration according to a third example of the present invention.

The following describes a third example of the present invention. The present example is another example corresponding to the first exemplary embodiment of the present invention. FIG. 13 shows the configuration of the present example.

The present example is characterized in that a memory access identification unit 721 of a MSHR searching unit 720 determines the upper 2 bytes of an address included in a memory access request as a memory access ID (which corresponds to S1 in the diagram).

In the present example, an "address", which is information that a memory access request always includes, is used. Therefore, the present example can be applied to the case where a CPU does not include a CPU number in a memory access request as well as to other cases. Therefore, the present example is characterized as versatile.

What is recorded on a memory access-MSHR correspondence table 730 of the present example is the associations of address ranges, which are specified by start and end addresses, with MSHRs.

A memory access association unit 722 of the present example includes a function of determining a candidate MSHR number from an address.

An operation of the present example is evident from Example 1 and therefore will not be described here.

In the present example, for example, a different MSHR is associated with each of the following address areas: an address area used by an OS and an address area used by an application. Therefore, the present example can be used for the purpose of curbing an increase in the latency of the memory access by the OS with the help of the memory access of the application.

EXAMPLE 4

The following describes a fourth example of the present invention. The present example is an example corresponding to the second exemplary embodiment of the present invention.

Figure 14:
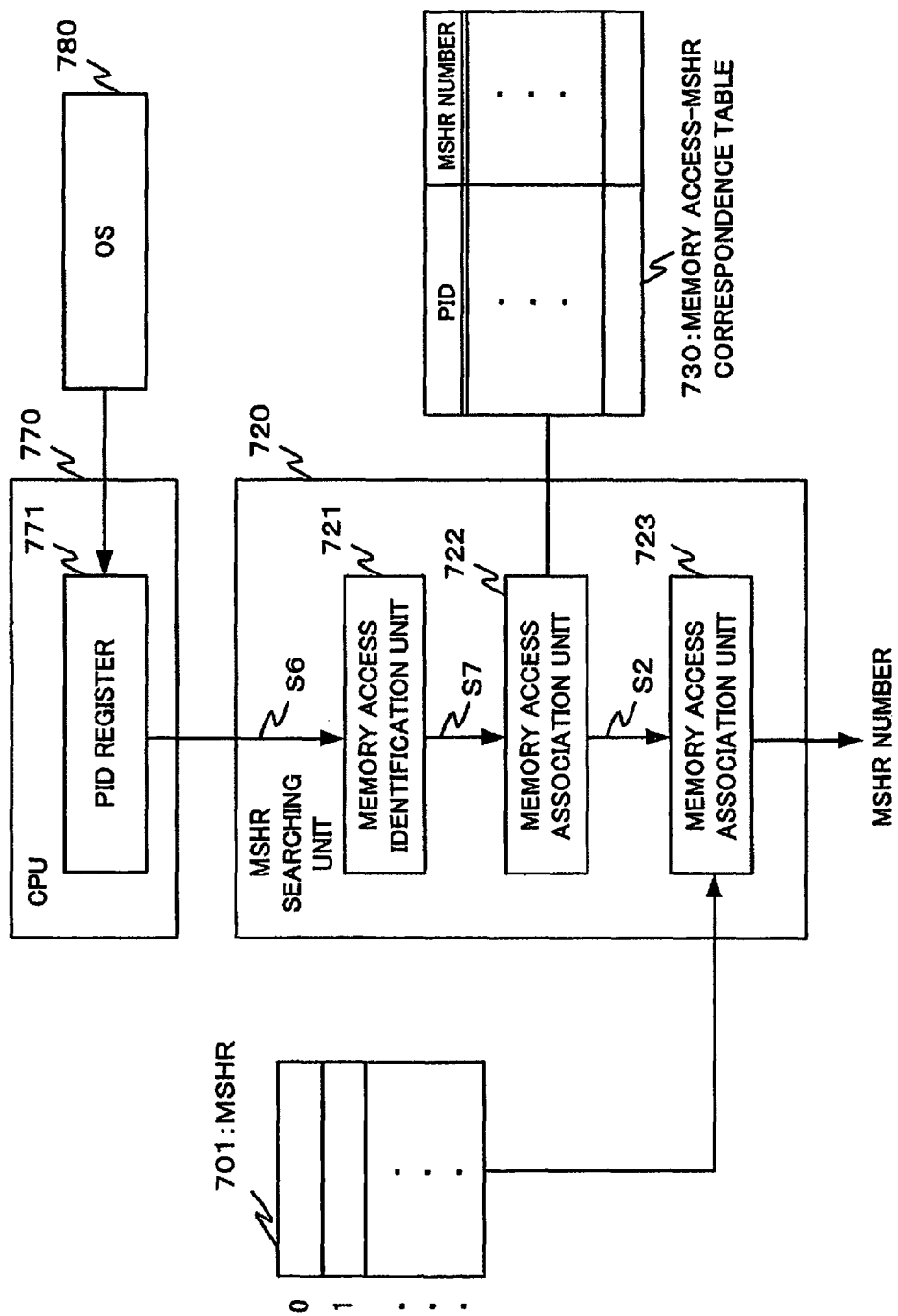
FIG. 14 A diagram illustrating the configuration according to a fourth example of the present invention.

FIG. 14 shows the configuration of the present example. In the present example, a CPU 770 includes a process ID (referred to as "PID" in the following description and diagrams) register 771. The present example is characterized in that when the CPU 770 issues a memory access request, a MD is added to the memory access request. In the diagram, the memory access request to which the PID is added is represented by S6.

In the present example, an OS 780 updates the HD register when a context switch of a process occurs. Therefore, the PID of the process executed by the CPU 770 is recorded in the PID register 771.

A memory access identification unit 721 of the present example determines a PID (represented by S7 in the diagram) in the memory access request as a memory access ID.

The memory access-MSHR correspondence table 730 stores the associations of PIDs with MSHRs. A memory access association unit 722 determines a MSHR number corresponding to a PID as a candidate MSHR number with the use of the memory access-MSHR correspondence table 730.

With the above configuration, it is possible to associate a PID of a process that performs a memory access directly with a MSHR number.

In general, an application includes one or more processes. Therefore, when PIDs are associated with MSHRs, it is possible to assign a MSHR to the application. Thus, there is the advantage that without assigning a process of the application to a specific CPU, it is possible to curb an increase in the latency of the memory access of a high-priority application.

It is desirable that if a CPU supports a plurality of hardware threads, a PID register be added to a context that is to be stored or restored when the CPU switches threads in order to update the PID register without using the OS.

EXAMPLE 5

The following describes a fifth example of the present invention. The present example is an example corresponding to the another configuration of the third exemplary embodiment of the present invention.

Figure 15:
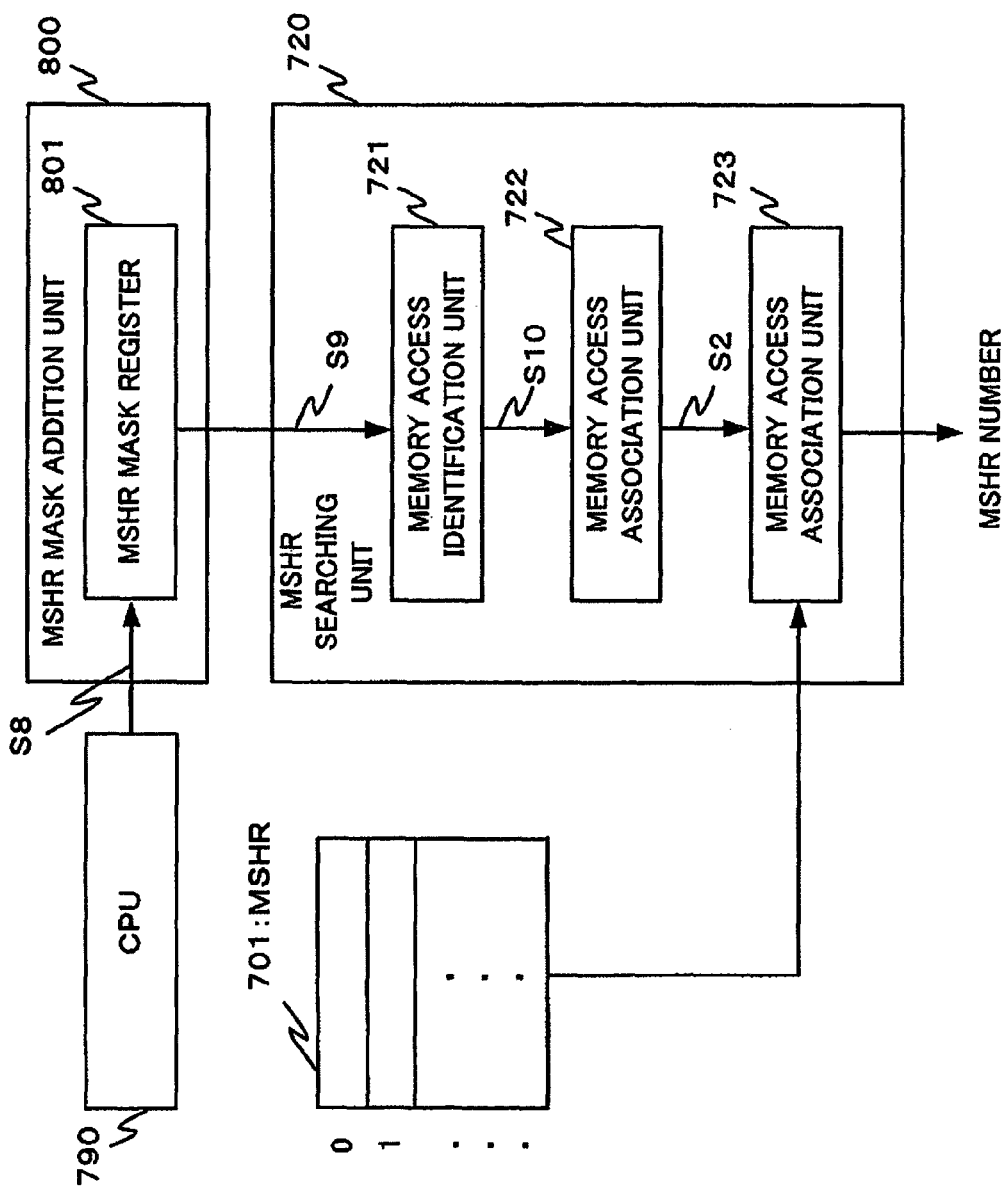
FIG. 15 A diagram illustrating the configuration according to a fifth example of the present invention.
Figure 16:
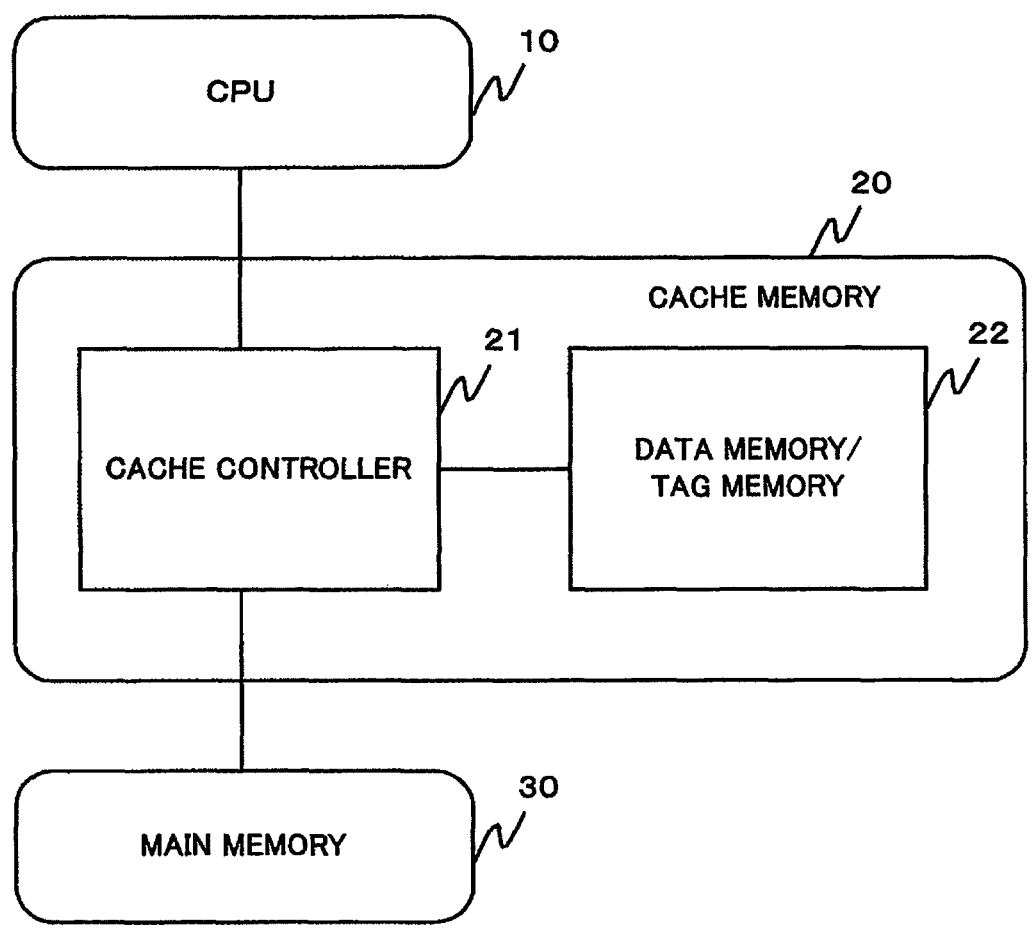
FIG. 16 A diagram showing the configuration of a cache according to a related technique of the present invention.
Figure 17:
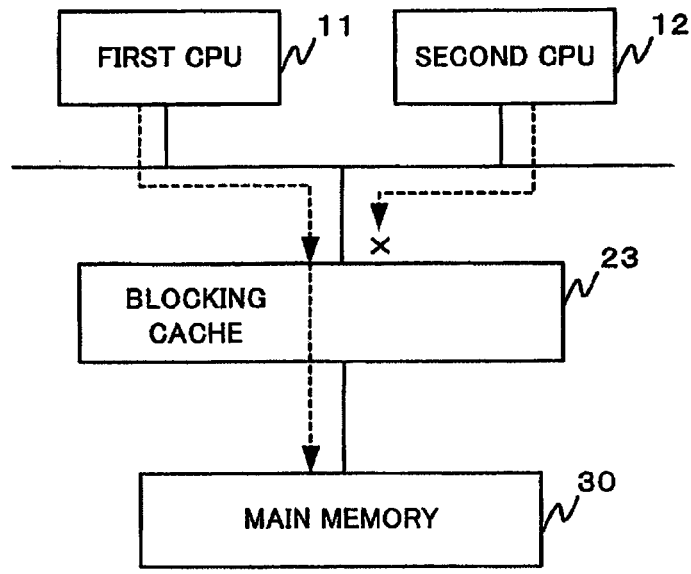
FIG. 17 A diagram showing an operation of a blocking cache according to a related technique of the present invention.

FIG. 15 shows the configuration of the present example. The present example is characterized in that there is a MSHR mask addition unit 800 between a CPU and a cache controller.

A MSHR mask register 801 is provided in the MSHR mask addition unit 800. The MSHR mask addition unit 800 includes a function of adding a MSHR mask to a memory access request (represented by S8 in the diagram) from the CPU 790. Incidentally, the memory access request to which the MSHR mask is added is represented by S9 in the diagram.

A memory access identification unit 721 of the present example determines the MSHR mask included in the memory access request as a memory access ID (represented by S10 in the diagram).

A memory access association unit 722 determines a number included in the MSHR mask as a candidate MSHR number. Therefore, the present example is characterized in that the cache controller does not have to hold a memory access-MSHR correspondence table.

In the present example, an OS 780 includes a function of rewriting a MSHR mask register 801. In response to a context switch of a process, the OS rewrites the MSHR mask register 801 in order to assign a MSHR to the process.

An operation of a memory access of the present example is evident from the description of the above examples and therefore will not be described. It is also evident that according to the present example, it is possible to curb an increase in the memory access latency of a high-priority application.

The present example has the advantage that the present example is also available even when a function of adding a MSHR mask to a to-be-issued memory request cannot be added to the CPU.

According to another configuration of the present example, instead of the MSHR mask addition unit 800, a memory access ID addition unit may be provided: The memory access ID addition unit includes a function of adding a different ID, such as a process ID, to a memory access request.

In the above case, the cache controller includes a memory access-MSHR correspondence table 730; the memory access association unit 722 works to determine a candidate MSHR number using the table.

Each of the exemplary embodiments and examples of the present invention has the following advantages.

According to each of the exemplary embodiments and examples of the present invention, it is possible to prevent a drop in the performance of a high-priority application. The reason is as follows: a memory access of the high-priority application and memory accesses of other applications are classified into different groups, and it is therefore possible to prevent all MSHRs from being used by the memory accesses from the other applications as well as to prevent an increase in the latency of the memory access of the high-priority application.

According to each of the exemplary embodiments and examples of the present invention, it is possible to improve the predictability of an operation of an application. The reason is as follows: a group of applications is divided into a plurality of groups, and it is possible to prevent MSHRs from being shared among different groups. Therefore, a memory access by an application that belongs to a different group does not use a MSHR assigned to a local group. Thus, it is possible to ensure that a certain number of MSHRs are always available. As a result, it is possible to reduce the amount of variation in the memory access latency and curb the amount of variation in the operation of the application.

Incidentally, the cache memory system of each of the exemplary embodiments and examples of the present invention can be realized by hardware, software or a combination of both.

For example, the cache memory system of each of the exemplary embodiments and examples of the present invention can be realized by hardware. However, the cache memory system may be realized by a computer that executes a program, which causes the computer to function as a cache memory system, after reading the program out from a computer-readable recording medium.

A method of using the cache memory of each of the exemplary embodiments and examples of the present invention can be realized by hardware. However, the method may be realized by a computer that executes a program, which causes the computer to execute the method of using the cache memory, after reading the program out from a computer-readable recording medium.

The above-described hardware and software configuration is not limited to a specific form. Any forms are available as long as the function of each of the above-described constituent elements is possible. For example, any of the following structures is possible: a structure in which circuits, components and the like for each function of the above-described constituent elements are built independently and separately; a structure in which a plurality of functions are integrally put into one circuit, component or the like.

The above has described the present invention with reference to the exemplary embodiments and the examples. However, the present invention is not limited to the above exemplary embodiments and the examples. Various modifications apparent to those skilled in the art may be made on the configuration and details of the present invention within the scope of the present invention.

This application is based upon and claims the benefit of priority from prior Japanese Patent Application No. 2008-215392, filed on Aug. 25, 2008, the disclosure of which is incorporated herein in its entirety by reference.

INDUSTRIAL APPLICABILITY

The present invention is preferably used for the purpose of improving the performance of a specific application, or of curbing the amount of variation in performance, on a device on which a plurality of applications run, which may be an embedded device such as a PC (Personal Computer), server or cellular phone.

REFERENCE SIGNS LIST 10, 400, 403, 710, 770: CPU
11, 611: First CPU
12, 612: Second CPU
20, 620: Cache memory
21, 760: Cache controller
22, 622: Data memory/tag memory
23: Blocking cache
24: Non-blocking cache
30, 630: Main memory
100, 710: MSHR
200, 720: MSHR searching unit
201, 721: Memory access identification unit
202, 722: Memory access association unit
203, 723: Unused MSHR determination unit
300, 761: Memory access-MSHR correspondence table
401: Memory access ID generation unit
402: MSHR mask generation unit
404: Memory access ID addition unit
501: Memory access speed-up unit
502: Latency increase prevention unit
503: Hit rate improvement unit
613: Third CPU
614: Fourth CPU
621: Cache controller
623: Latency increase prevention unit
624: Hit rate improvement unit
740: Memory access-MSHR correspondence table update unit
750, 780: OS
751: Memory access speed-up unit
752: Affinity control unit
762: Way lock register
771: PID register
800: MSHR mask addition unit
801: MSHR mask register

The invention claimed is:

1. A cache memory, comprising:
a plurality of MSHRs (Miss Status/Information Holding Registers) which are used when a memory access turns out to be a cache miss;
a memory access identification unit which identifies a given memory access so that an identifier is attached to the given memory access;
a memory access-MSHR correspondence table which stores, for each identifier of a memory access, a correspondence between the memory access and at least one of the MSHRs;
a memory access association unit which associates the given memory access with at least one of the MSHRs by referring to the memory access-MSHR correspondence table; and
an unused MSHR determination unit which determines an MSHR to be assigned to the given memory access in such a way that an unused one of at least one of the MSHRs which are associated with the given memory access is assigned to the given memory access.

2. The cache memory according to claim 1, wherein,
the unused MSHR determination unit examines whether each of the MSHRs which are associated with the given memory access is in use or not, outputs, for each of the examined. MSHRs, the examined MSHR as an unused MSHR when the examined MSHR is not in use, and outputs a fact that the candidate for the examined MSHR is in use when the examined MSHR is in use.

3. The cache memory according to claim 1, wherein,
the identifier comprises a memory access ID using a CPU number which is a number assigned to each CPU of a plurality of CPUs.

4. The cache memory according to claim 1, wherein,
the identifier comprises a memory access ID using an address which is included in a memory access request corresponding to the memory access.

5. The cache memory according to claim 1, wherein,
the identifier comprises a memory access ID using a process ID of a process which a CPU processes.

6. The cache memory according to claim 1, wherein,
the identifier comprises a memory access ID using a MSHR mask representing a group of MSHRs available to a given memory access.

7. The cache memory according to claim 1, wherein,
the memory access-MSHR correspondence table includes:
a first correspondence between a memory access with a high priority and at least two of the MSHRs; and
a second correspondence between a memory access with a lower priority and at least one of the MSHRs, and
said at least two of the MSHRs for the memory access with the high priority include said at least one of the MSHRs for the memory access with the lower priority and at least one MSHR which is provided for the memory access with the higher priority but is not provided for the memory access with the lower priority.

8. A cache memory system, comprising:
the cache memory claimed in claim 1; and
a CPU which is equipped with a memory access ID generation unit which adds a memory access ID to a memory access, wherein
the memory access identification unit regards the memory access ID added by the CPU as the identifier of the memory access which is to be transferred to the memory access association unit.

9. The cache memory system according to claim 8, further comprising:
a cache hit rate improvement unit which sets up in a way that prevents data used by high-priority application software from being driven out of the cache memory by other application software; and a memory access speed-up unit which is used by combining the memory access identification unit, the memory access association unit, and the cache hit rate improvement unit.

10. The cache memory system according to claim 9, wherein
the memory access speed-up unit is provided in an operating system.

11. A cache memory system, comprising:
the cache memory claimed in claim 1; and
a memory access ID addition unit which accepts a memory access issued by a CPU and issues the memory access to the cache memory after adding a memory access ID to the memory access, wherein
the memory access identification unit regards the memory access ID added by the memory access ID addition unit as the identifier of the memory access which is to be transferred to the memory access association unit.

12. A method of using a cache memory, comprising:
a step of providing a plurality of MSHRs (Miss Status/Information Holding Registers) which are used when a memory access turns out to be a cache miss;
a memory access identification step of identifying a given memory access so that an identifier is attached to the given memory access;
a step of providing a memory access-MSHR correspondence table which stores, for each identifier of a memory access, a correspondence between the memory access and at least one of the MSHRs;
a memory access association step of associating the given memory access with at least one of the MSHRs by referring to the memory access-MSHR correspondence table; and
an unused MSHR determination step which determines an MSHR to be assigned to the given memory access in such a way that an unused one of at least one of the MSHRs which are associated with the given memory access is assigned to the given memory access, wherein the steps are each performed by a cache memory including the plurality of MSHRs.

13. The method of using the cache memory according to claim 12, wherein said unused MSHR determination step includes:
examining whether each of the MSHRs which are associated with the given memory access is in use or not;
outputting, for each of the examined MSHRs, the examined MSHR as an unused MSHR when the examined MSHR is not in use; and
outputting a fact that the examined MSHR is in use when the examined MSHR is in use.

14. The method of using the cache memory according to claim 12, wherein,
the identifier comprises a memory access ID using a CPU number which is a number assigned to each CPU of a plurality of CPUs.

15. The method of using the cache memory according to claim 12, wherein,
the identifier comprises a memory access ID using an address which is included in a memory access request corresponding to the memory access.

16. The method of using the cache memory according to claim 12, wherein,
the identifier comprises a memory access ID using a process ID of a process which a CPU processes.

17. The method of using the cache memory according to claim 12, wherein,
the identifier comprises a memory access ID using a MSHR mask representing a group of MSHRs available to a given memory access.

18. The method of using the cache memory according to claim 12, wherein
the memory access-MSHR correspondence table includes:
a first correspondence between a memory access with a high priority and at least two of the MSHRs; and
a second correspondence between a memory access with a lower priority and at least one of the MSHRs, and
said at least two of the MSHRs for the memory access with the high priority include said at least one of the MSHRs for the memory access with the lower priority and at least one MSHR which is provided for the memory access with the higher priority but is not provided for the memory access with the lower priority.

19. The method of using the cache memory according to claim 12, wherein:
a CPU further includes a memory access ID generation step of adding a memory access ID to a memory access request; and
at the memory access identification step, the memory access ID added by the CPU is regarded as the identifier of the memory access which is to be transferred to the memory access association step.

20. The method of using the cache memory according to claim 19, further comprising:
a cache hit rate improvement step of setting up in a way that prevents data used by high-priority application software from being driven out of a cache memory by other application software; and
a memory access speed-up step which is used by combining the memory access identification step, the memory access association step, and the cache hit rate improvement step.

21. The method of using the cache memory according to claim 20, wherein
the memory access speed-up step is performed by an operating system.

22. The method of using the cache memory according to claim 12, further comprising
a memory access ID addition step of accepting a memory access issued by a CPU and issuing the memory access to a cache memory after adding a memory access ID to the memory access, wherein
at the memory access identification step, the memory access ID added by the memory access ID addition step is regarded as the identifier of the memory access which is to be transferred to the memory access association step.

23. A non-transitory computer-readable medium storing a program, said program causing a computer to function as:
a plurality of MSHRs (Miss Status/Information Holding Registers) which are used when a memory access turns out to be a cache miss;
a memory access identification unit which identifies a given memory access so that an identifier is attached to the given memory access;
a memory access-MSHR correspondence table which stores, for each identifier of a memory access, a correspondence between the memory access and at least one of the MSHRs;
a memory access association unit which associates the given memory access with at least one of the MSHRs by referring to the memory access-MSHR correspondence table; and an unused MSHR determination unit which determines an MSHR to be assigned to the given memory access in such a way that an unused one of at least one of the MSHRs which are associated with the given memory access is assigned to the given memory access.

24. The non-transitory computer-readable medium according to claim 23, wherein the program further causes the computer to function as the unused MSHR determination unit, wherein said to function as the unused MSHR determination unit includes:
  examining whether each of the MSHRs which are associated with the given memory access is in use or not;
  outputting, for each of the examined MSHRs, the examined MSHR as an unused MSHR when the examined MSHR is not in use; and
  outputting a fact that the examined MSHR is in use when the examined MSHR is in use.

25. The non-transitory computer-readable medium according to claim 23, wherein, the identifier comprises a memory access ID using a CPU number which is a number assigned to each CPU of a plurality of CPUs.

26. The non-transitory computer-readable medium according to claim 23, wherein, the identifier comprises a memory access ID using an address which is included in the memory access request corresponding to the memory access.

27. The non-transitory computer-readable medium according to claim 23, wherein, the identifier comprises a memory access ID using a process ID of a process which a CPU processes.

28. The non-transitory computer-readable medium according to claim 23, wherein, the identifier comprises a memory access ID using a MSHR mask representing a group of MSHRs available to a given memory access.

29. The non-transitory computer-readable medium according to claim 23, wherein the memory access-MSHR correspondence table includes:
  a first correspondence between a memory access with a high priority and at least two of the MSHRs;
  a second correspondence between a memory access with a lower priority and at least one of the MSI-IRs, and
  said at least two of the MSHRs for the memory access with the high priority include said at least one of the MSHRs for the memory access with the lower priority and at least one MSHR which is provided for the memory access with the higher priority but is not provided for the memory access with the lower priority.

* * * * *